(12) United States Patent
De La Reza et al.

(10) Patent No.: US 8,488,303 B2
(45) Date of Patent: Jul. 16, 2013

(54) ELECTRICAL DISTRIBUTION CENTER

(75) Inventors: Alvaro Gino De La Reza, El Paso, TX (US); Erick A. Rodriguez, Chihuahua (MX); Michael F. Loew, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 279 days.

(21) Appl. No.: 13/097,249

(22) Filed: Apr. 29, 2011

(65) Prior Publication Data

US 2011/0299229 A1 Dec. 8, 2011

Related U.S. Application Data

(60) Provisional application No. 61/348,362, filed on May 26, 2010.

(51) Int. Cl.
*H02B 1/04* (2006.01)

(52) U.S. Cl.
USPC ............ 361/641; 361/642; 361/646; 361/648

(58) Field of Classification Search
None
See application file for complete search history.

(56) References Cited

U.S. PATENT DOCUMENTS

| | | | |
|---|---|---|---|
| 5,715,135 A | 2/1998 | Brussalis et al. | |
| 5,788,529 A | 8/1998 | Borzi et al. | |
| 5,823,812 A * | 10/1998 | Bhargava et al. | 439/345 |
| 6,150,734 A | 11/2000 | Neibecker et al. | |
| 6,468,091 B2 | 10/2002 | Roussel et al. | |
| 7,635,212 B2 | 12/2009 | Seidler | |
| 8,167,650 B2 * | 5/2012 | Gagne | 439/606 |

* cited by examiner

*Primary Examiner* — Boris Chervinsky
(74) *Attorney, Agent, or Firm* — Thomas N. Twomey

(57) ABSTRACT

An electrical distribution center includes a housing composed of a first material having a first melting point, an electrical bus disposed in the housing, a removable electrical/electronic component electrically connected to the electrical bus and which produces a predetermined temperature in operation higher than the first melting point, an opening formed in the housing, and a socket mounted within the housing opening and physically supporting the electrical/electronic component. The socket is composed of a second, differing material having a second melting point higher than the predetermined temperature produced by the electrical/electronic component in operation, whereby the housing is effectively isolated and protected by the socket as the electrical/electronic component operates.

18 Claims, 4 Drawing Sheets

ELECTRICAL DISTRIBUTION CENTER

This application claims benefit of priority from U.S. Provisional Patent Application No. 61/348,362, filed May 26, 2010.

TECHNICAL FIELD OF INVENTION

The invention relates generally to electrical distribution centers.

BACKGROUND OF INVENTION

Electrical distribution centers are widely used in vehicles. An electrical distribution center can package various fuses, relays and other electrical devices in a central location. Such electrical distribution centers include provisions for electrically connecting a power source and electrical devices housed in the electrical distribution center to electrical wiring harness connectors for supplying power and control signals to various electrical systems of the vehicle. Examples of electrical distribution centers may be found in U.S. Pat. No. 5,715,135 granted to Brussalis et al., U.S. Pat. No. 5,788,529 granted to Borzi et al., and U.S. Pat. No. 7,635,212 granted to Seidler. Electrical distribution centers may also be known as junction boxes, power distribution boxes, electrical centers, and the like.

Currently, electrical distribution centers that incorporate circuit protection devices such as fuses and relays require housings that are made of a high temperature plastic, such as nylon, to resist the heat generated in the high electrical resistance, high current areas. The housings are homogeneous, so the material used in those areas are used for the entire housing. Generally, the high electrical resistance, high current areas are located near relays and fuses and their connecting terminals. The other areas of the plastic are generally exposed to much lower temperatures. There is a higher cost associated with high temperature materials, so the requirements for a few areas, which may typically be about 10% of the plastic volume of the housing, drive a higher cost for the entire housing.

SUMMARY OF THE INVENTION

The invention can aid in providing an electrical distribution center assembly including a housing composed of a first material having a first melting point; an electrical bus disposed in the housing; a removable electrical/electronic component electrically connectable to the electrical bus and which produces a predetermined temperature in operation higher than the first melting point; an opening formed in the housing; and a socket mounted within the housing opening and physically supporting the electrical/electronic component in electrical contact with the electrical bus, the socket being composed of a second, differing material having a second melting point higher than the predetermined temperature produced by the electrical/electronic component in operation, whereby the housing is effectively isolated and protected by the socket as the electrical/electronic component operates.

The invention can also aid in providing an electrical distribution center assembly in which the electrical/electronic component includes a component body and an electrical contact that extends from the component body, the socket has a positive stop spaced apart from the housing, and the component body is seated on the positive stop so that an air gap is provided between the component body and the housing.

The invention can also aid in providing an electrical distribution center assembly in which the electrical/electronic component includes a component body and an electrical contact that extends from the component body and electrically contacts the electrical bus, and the socket includes a shroud that substantially surrounds an electrical interface between the contact and the electrical bus, whereby the housing is effectively protected from heat generated at the electrical interface as the electrical/electronic component operates.

The invention can also aid in providing an electrical distribution center assembly including a housing formed from an upper housing attached to a lower housing, the upper housing composed of a first material having a first melting point; an accommodation space defined by the housing; an electrical bus disposed in the accommodation space and electrically connectable to a power supply and at least one electrical load; a removable electrical/electronic component electrically connectable to the electrical bus and which produces a predetermined temperature in operation higher than the first melting point; and a socket carried by the upper housing and physically supporting the electrical/electronic component in electrical contact with the electrical bus, the socket being composed of a second, differing material having a second melting point higher than the predetermined temperature produced by the electrical/electronic component in operation, whereby the upper housing is effectively isolated and protected by the socket as the electrical/electronic component operates.

The invention can also aid in providing a method of protecting an electrical distribution center from the heat emitted by a removable electrical/electronic component that is carried by the housing, the electrical/electronic component producing a predetermined temperature in operation, the steps including: providing an electrical distribution center housing composed of a first material that has a melting temperature that is less than the predetermined temperature, providing an opening in the housing; arranging an electrical bus within the housing; mounting a socket in the opening, where the socket is composed of a second material that has a melting temperature that is greater than the predetermined temperature; and plugging an electrical/electronic component for regulating current into the socket so that the electrical/electronic component extends through the opening and electrically connects to the electrical bus.

Embodiments of the invention can be enabled such that the electrical bus can be implemented, for example, as a circuit board, a printed circuit board, multi-layer circuit board, a routed wire plate, a bus bar, a bus plate assembly, an electrically conductive metal plate or any combination thereof. The invention can further be implemented in electrical distribution center embodiments that are suitable for installation in a vehicle.

Furthermore, the invention can aid in enabling electrical distribution center housings that carry removable electrical/electronic components, such as relays and fuses, to be made from lower cost materials. For example, many known electrical distribution center housings are composed of nylon. The invention can aid in enabling housings to be made from less expensive, lower melting temperature materials, such as polypropylene.

Further features, uses and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
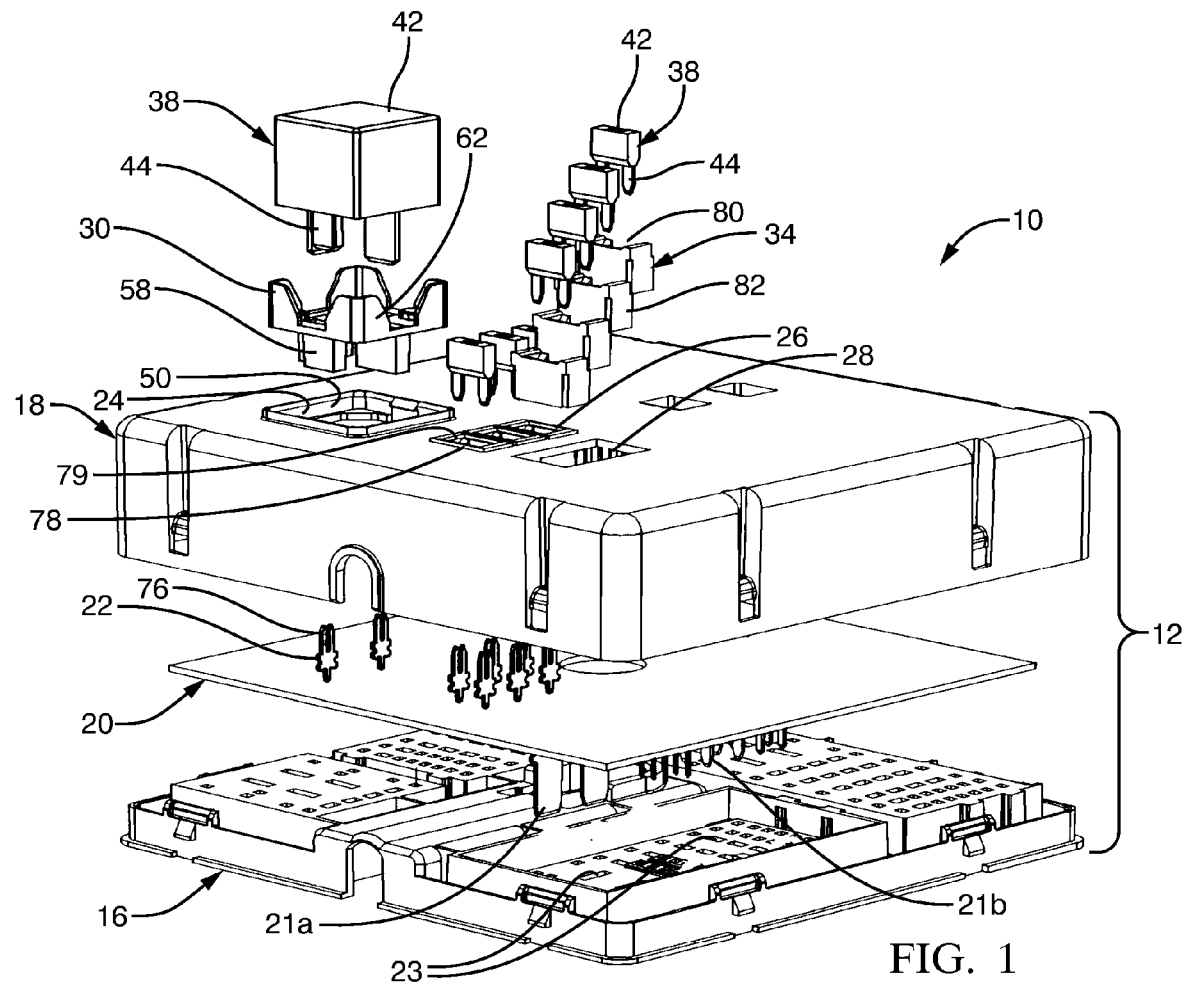
FIG. 1 is an exploded perspective view of an electrical distribution center in accordance with an embodiment of the present invention.

Referring in more detail to the drawings, FIGS. 1-6 illustrate an electrical distribution center assembly 10 in accordance with a preferred embodiment of the present invention that includes a housing 12 composed of a first material having a first melting point, an electrical bus 20 disposed in housing 12, at least one removable electrical/electronic component 38 electrically connectable to electrical bus 20 and which produces a predetermined temperature in operation that may be higher than the first melting point, an opening 24 formed in housing 12, and a socket 30 mounted within opening 24 and physically supporting electrical/electronic component 38 in electrical contact with electrical bus 20. Socket 30 is composed of a second, differing material having a second melting point that is higher than the predetermined temperature produced by the electrical/electronic component 38 in operation, whereby housing 12 is effectively isolated and protected by socket 30 as electrical/electronic component 38 operates.

Figure 2:
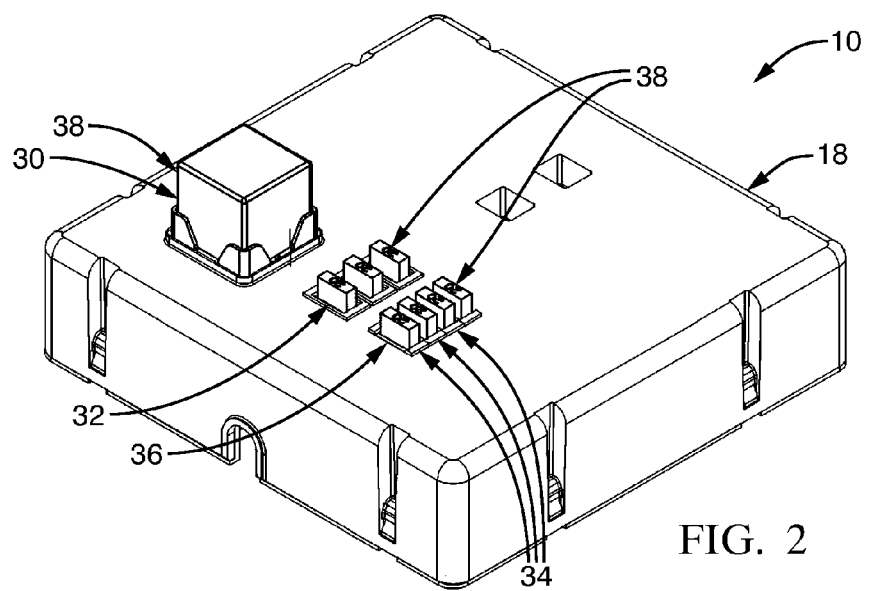
FIG. 2 is a perspective view of an electrical distribution center in accordance with an embodiment of the present invention.
Figure 3:
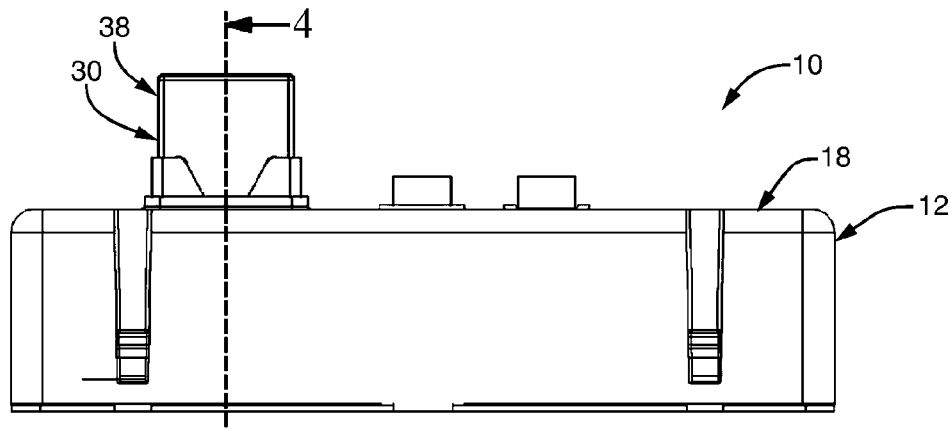
FIG. 3 is a side view of an electrical distribution center in accordance with an embodiment of the present invention.
Figure 4:
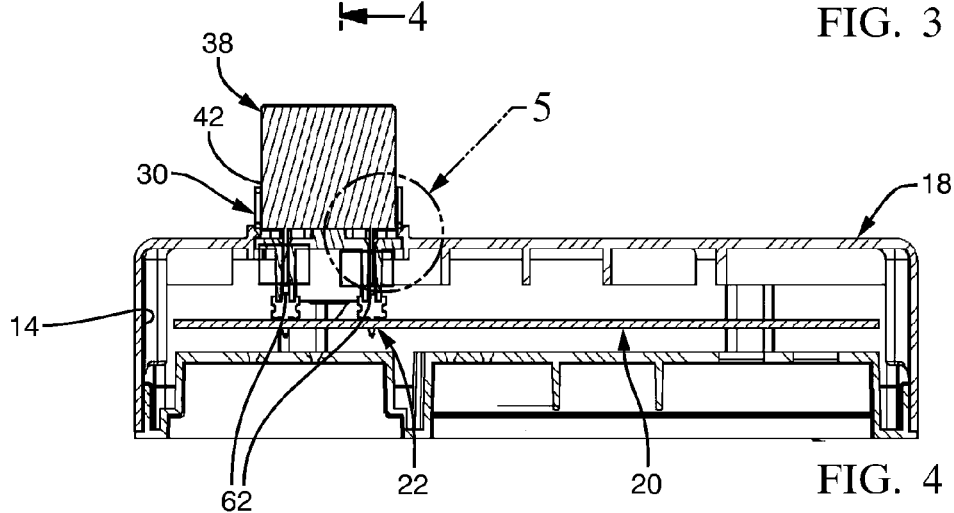
FIG. 4 is a side section view of an electrical distribution center in accordance with an embodiment of the present invention taken along line 4-4 of FIG. 3.

As best shown on FIGS. 1 and 2, electrical distribution center assembly 10 includes housing 12 and an accommodation space 14 (shown on FIGS. 4-6) defined by housing 12. Housing 12 is formed from a lower housing 16 and an upper housing 18 attached to lower housing 16. Alternatively, housing 12 may be a unitary construction or may be constructed from more than two pieces. Electrical bus 20 is disposed in accommodation space 14 and carried by lower housing 16. Electrical bus 20 is adapted and configured to connect a battery power supply and vehicle electrical loads to electrical/electronic components 38. Electrical bus 20 may include a circuit board, a printed circuit board, multi-layer circuit board, a routed wire plate, a bus bar, a bus plate, a bus plate assembly, an electrically conductive metal plate or any combination thereof.

As shown on FIG. 1, at least one bladed terminal 21a extends downward from electrical bus 20 for providing electrical connection between electrical bus 20 and a power supply, such as a vehicle battery (not shown). As shown on FIG. 1, at least one bladed terminal 21b extends downward from electrical bus 20 for providing electrical connection between electrical bus 20 and at least one electrical load, such as a vehicle radio (not shown) or air conditioner compressor motor (not shown). Bladed terminals 21a, 21b extend through slots 23 in lower housing 16 for engagement with female terminals of one or more electrical connectors of a wiring harness bundle (not shown). Other mechanisms for connecting electrical bus 20 to power supplies and electrical loads may also be used. For example, electrical bus 20 may be electrically connected to a vehicle battery stud by a wire and ring terminal (not shown).

As shown on FIG. 1, a plurality of tuning fork terminals 22 extend upward from electrical bus 20 for electrical connection with electrical/electronic components 38. Other types of terminals suitable for mating with electrical/electronic components 38 may also be used in place of tuning fork terminals 22. Or, in other alternative embodiments, electrical bus 20 may be adapted and configured for mating directly with removable electrical/electronic components without need for terminals 22. A first opening 24, a plurality of second openings 26, and a third opening 28 are defined by upper housing 18. Each of first, second, and third openings 24, 26, 28 are in communication with accommodation space 14.

As shown on FIG. 2, a first socket 30 is mounted within first opening 24, a plurality of second sockets 32 are each mounted within a respective one of the second openings 26, and a plurality of third sockets 34 are each mounted within third opening 28. In combination, when the plurality of third sockets 34 are inserted in third cavity 28 and seated in housing 12, each third socket 34 is disposed adjacent at least one other third socket 34 in a row forming a ganged socket combination 36.

A removable electrical/electronic component 38 is disposed in first socket 30 and electrically connected to tuning fork terminals 22. A removable electrical/electronic component 38 is disposed in each one of the second sockets 32 and electrically connected to tuning fork terminals 22, and a removable electrical/electronic component 38 is disposed in each one of the third sockets 34 and electrically connected to tuning fork terminals 22. Removable electrical/electronic component 38 may be a fuse, relay, circuit breaker, fusible link, or other device that regulates an electrical circuit and produces a high temperature in operation—high enough to melt plastic materials.

In a preferred embodiment, upper and lower housings 18, 16 are each molded from a first material, such as polypropylene, that has a first melting point. First, second, and third sockets 30, 32, 34 are each molded from a second material having a melting point that is greater than the melting point of the first material. In a preferred embodiment, the second material is nylon. In alternate embodiments, upper housing 18 is composed of the first material and lower housing 16 is composed of a material that is different from the first material.

In a preferred embodiment, removable electrical/electronic component 38 produces a predetermined temperature in operation. Such predetermined temperature may be higher than the melting point of the first material. This second material differs from the first material and has a second melting point higher than the predetermined temperature produced by electrical/electronic component 38 in operation, whereby housing 12 is effectively isolated and protected by socket 30 as electrical/electronic component 38 operates.

As shown on FIG. 1, electrical/electronic component 38 includes an electrical/electronic component body 42 and contacts 44, in the form of blades (two blades are shown), extending from electrical/electronic component body 42.

As shown on FIGS. 3-5 and 7, upper housing 18 defines a first seat 50. First seat 50 includes a recessed ledge 54 that forms a rim around first opening 24, an outer wall 56 surrounding ledge 54, and a flexible lock 58 extending from outer wall 56.

Figure 5:
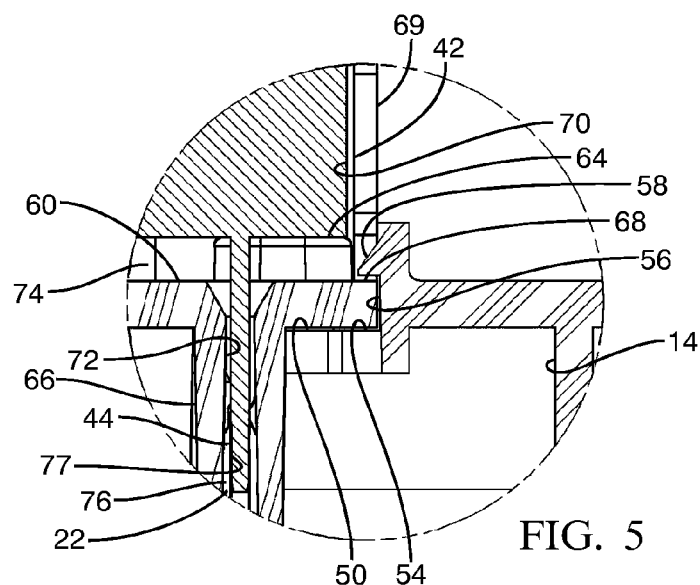
FIG. 5 depicts an aspect of an electrical splice assembly in accordance with an embodiment of the present invention taken from detail 5 of FIG. 4.
Figure 6:
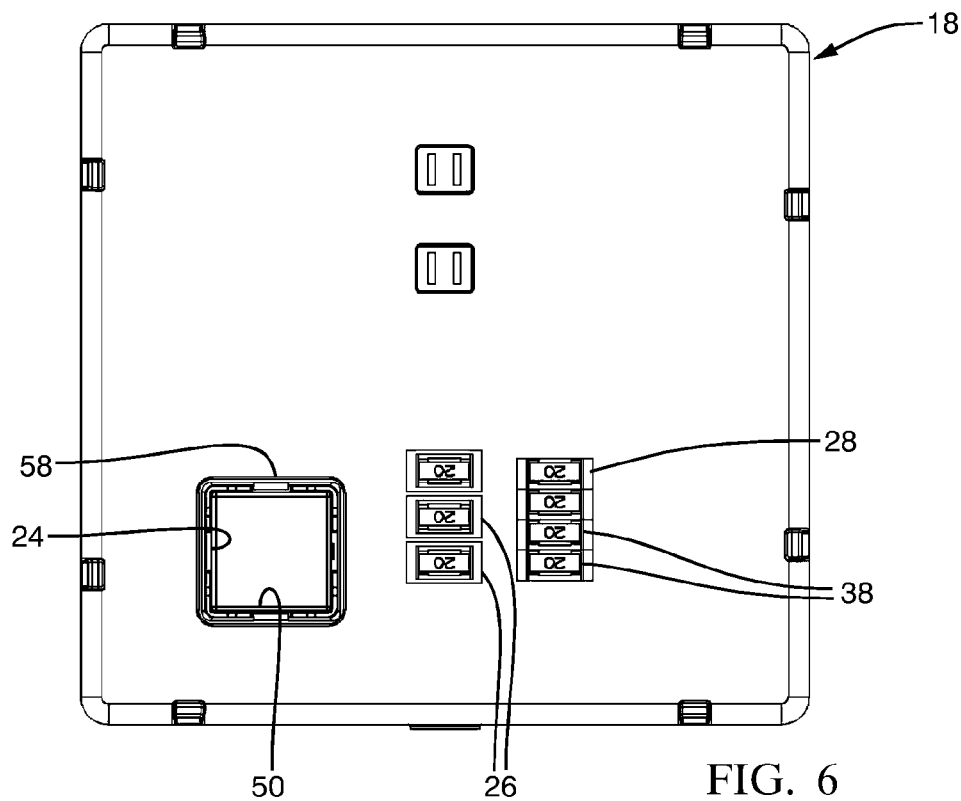
FIG. 6 is a top view of an electrical distribution center in accordance with an embodiment of the present invention.

As shown on FIGS. 1 and 5, first socket 30 includes a floor 60, side walls 62 extending upward from floor 60, a positive stop in the form of a rib 64 formed in side walls 62 at a location that is spaced apart from floor 60, at least one shroud 66 (two are shown in the view) extending downward from floor 60, and a latching surface 68 for engaging flexible lock 58 for retaining socket 30 in first opening 24. Floor 60 and side walls 62 form an upper socket body 69 defining a first socket cavity 70 adapted and configured for receiving electrical/electronic component body 42. A shroud passage 72 in communication with first socket cavity 70 extends through each shroud 66.

As shown on FIGS. 2-5, first socket 30 is mounted within first opening 24 and seated in first seat 50. In this seated position, floor 60 is seated on ledge 54, shrouds 66 extend downward through first opening 24 into accommodation space 14. Flexible lock 58 engages latching surface 68 on first socket 30 retaining first socket 30 in a seated position in first seat 50.

As shown on FIGS. 2-5, electrical/electronic component 38 is fully inserted into first socket 30. Socket 30 physically supports electrical/electronic component 38 in electrical contact with electrical bus 20. In a fully seated position, electrical/electronic component body 42 is received in first socket cavity 70 and seated on rib 64. An air gap 74 is formed between electrical/electronic component body 42 and floor 60 providing air space for dissipating heat and for providing thermal insulation between electrical/electronic component body 42 and upper housing 18 during operation. Each contact 44 extends from electrical/electronic component body 42 downward into a respective one of shroud passages 72 and is electrically connected to a respective one of tuning fork terminals 22. Shroud 66 functions to align contact 44 with a respective one of tuning fork terminals 22 during mating. A mating portion 76 of tuning fork terminal 22 extends into shroud passage 72 and electrically contacts contact 44 at an electrical interface 77 located within shroud passage 72. Shroud 66 axially surrounds contact 44. Shroud 66 substantially surrounds electrical interface 77 between tuning fork terminal 22 and contact 44 such that shroud 66 is interposed between electrical interface 77 and upper housing 18, thereby shielding upper housing 18 from heat emitted at electrical interface 77 during operation.

As shown on FIGS. 1 and 2, similar to first socket 30, each second socket 32 includes side walls 78 that define a cavity 79 for receiving electrical/electronic component 38. In an alternate embodiment, each third socket 34 is configured similar to second socket 32, except that third socket 34 has an open side 80. When a plurality of third sockets 34 are inserted into third opening 28 forming ganged socket combination 36, a side wall 82 from an adjacent third socket 34 is disposed on open side 80 providing containment and thermal insulation on the open side 80. A second socket 32 having side walls 78 entirely surrounding the cavity 79 may be used at one end of the socket combination 36 to provide containment and thermal insulation for the last socket in the ganged socket combination 36.

Figure 7:
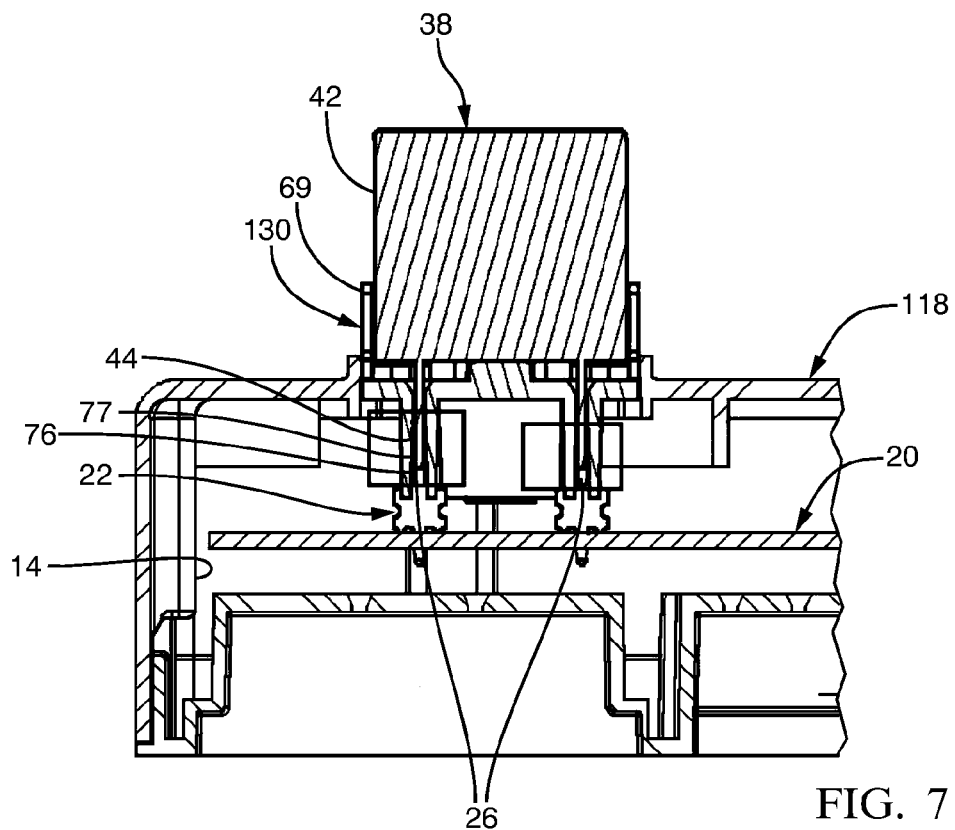
FIG. 7 is a partial cross sectional view of an electrical splice assembly in accordance with an embodiment of the present invention.

As shown on FIG. 7, in an alternate embodiment the contact force between contacts 44 and tuning fork terminals 22 may function to enable electrical/electronic component 38 to retain a fourth socket 130 to an upper housing 118 without need for a direct latching mechanism between fourth socket 130 and upper housing 118.

Figure 8:
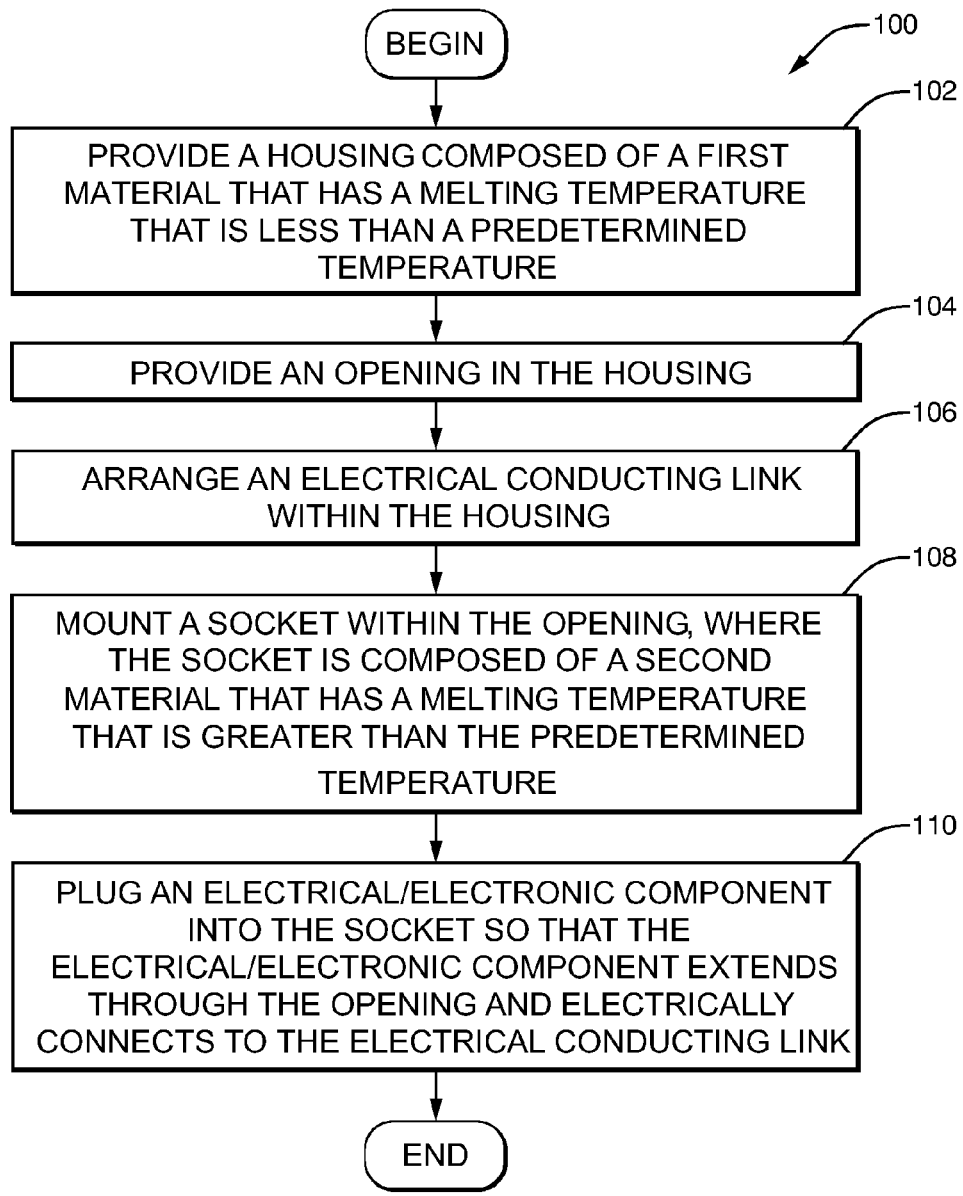
FIG. 8 illustrates a method of protecting a housing of an electrical distribution center from the heat emitted by a removable electrical/electronic component in accordance with an aspect of the invention.

In accordance with another aspect of the invention, FIG. 8 illustrates a preferred method 100 of protecting housing 12 of electrical distribution center 10 from the heat emitted by removable electrical/electronic component 38. Step 102 provides a housing 12 composed of a first material that has a melting temperature that is less than the predetermined temperature. Step 104 provides an opening 24 in housing 12. Step 106 provides for arranging electrical bus 20 within the housing 12. Step 108 provides for mounting a socket 30 in the opening, where socket 30 is composed of a second material that has a melting temperature that is greater than the predetermined temperature. Step 110 provides for plugging electrical/electronic component 38 into socket 30 so that the electrical/electronic component 38 extends through opening 24 and electrically connects to electrical bus 20.

While this invention has been described in terms of the preferred embodiments thereof, it is not intended to be so limited, but rather only to the extent set forth in the claims that follow.

We claim:

1. An electrical distribution center comprising:
   a housing composed of a first material having a first melting point;
   an electrical bus disposed in the housing;
   a removable electrical/electronic component electrically connectable to the electrical bus and which produces a predetermined temperature in operation higher than the first melting point;
   an opening formed in the housing; and
   a socket mounted within the housing opening and physically supporting the electrical/electronic component in electrical contact with the electrical bus, the socket being composed of a second, differing material having a second melting point higher than the predetermined temperature produced by the electrical/electronic component in operation, whereby the housing is effectively isolated and protected by the socket as the electrical/electronic component operates.

2. The electrical distribution center as described in claim 1, wherein the electrical/electronic component comprises a component body and an electrical contact that extends from the component body, the socket having a positive stop spaced apart from the housing, the component body being seated on the positive stop providing an air gap between the component body and the housing.

3. The electrical distribution center as described in claim 1, wherein the electrical/electronic component comprises a component body and an electrical contact that extends from the component body and electrically contacts the electrical bus, the socket comprising a shroud that substantially surrounds an electrical interface between the contact and the electrical bus, whereby the housing is effectively protected from heat generated at the electrical interface as the electrical/electronic component operates.

4. The electrical distribution center as described in claim 1, wherein the housing defines a ledge that extends around the periphery of the opening and the socket is seated on the ledge.

5. The electrical distribution center as described in claim 4, wherein the housing further defines a lock and the socket comprises a surface that cooperates with the lock to retain the socket in the housing opening.

6. The electrical distribution center as described in claim 1, wherein the electrical bus includes one of a printed circuit board, a routed wire plate, an electrically conductive metal plate, a bus bar, or any combination thereof.

7. The electrical distribution center as described in claim 6 further comprising a terminal projecting outward from the electrical bus, wherein the electrical/electronic component comprises a component body and an electrical contact that extends from the component body and electrically contacts the terminal.

8. The electrical distribution center as described in claim 7, wherein the socket comprising a shroud that substantially surrounds an electrical interface between the electrical contact and the terminal, whereby the housing is effectively protected from heat generated at the electrical interface as the electrical/electronic component operates.

9. The electrical distribution center as described in claim 1, wherein the electrical bus is a printed circuit board.

10. The electrical distribution center as described in claim 1, wherein the electrical bus is a routed wire plate.

11. The electrical distribution center as described in claim 1, wherein the electrical bus is an electrically conductive metal plate.

12. The electrical distribution center as described in claim 1, wherein the electrical bus is a bus bar.

13. The electrical distribution center as described in claim 1, wherein the electrical/electronic component is selected from the group consisting of fuses, fusible links, circuit breakers, relays and other devices that regulate an electrical circuit.

14. The electrical distribution center as described in claim 1 further comprising:
   a second socket mounted within the housing opening adjacent the socket recited in claim 1; and
   a second removable electrical/electronic component received in the second socket and electrically connected to the electrical bus, wherein the second socket being composed of the second material, whereby the housing is effectively isolated and protected by the second socket as the second electrical/electronic component operates.

15. An electrical distribution center comprising:
   a housing comprising an first housing member attached to a second housing member, the first housing member composed of a first material having a first melting point;
   an accommodation space defined by the housing;
   an electrical bus disposed in the accommodation space and electrically connectable to a power supply and at least one electrical load;
   a removable electrical/electronic component electrically connectable to the electrical bus and which produces a predetermined temperature in operation higher than the first melting point; and
   a socket carried by the first housing member and physically supporting the electrical/electronic component in electrical contact with the electrical bus, the socket being composed of a second, differing material having a second melting point higher than the predetermined temperature produced by the electrical/electronic component in operation, whereby the first housing member is effectively isolated and protected by the socket as the electrical/electronic component operates.

16. The electrical distribution center as described in claim 15, wherein the electrical bus includes at least one of a printed circuit board, a routed wire plate, a bus bar and an electrically conductive metal plate or any combination thereof.

17. The electrical distribution center as described in claim 15, wherein the electrical/electronic component comprises a component body and an electrical contact that extends from the component body and electrically contacts the electrical bus, the socket having a positive stop spaced apart from the first housing member, the component body being seated on the positive stop providing an air gap between the component body and the first housing member.

18. The electrical distribution center as described in claim 15, wherein the electrical/electronic component comprises a component body and an electrical contact that extends from the component body and electrically contacts the electrical bus, the socket comprising a shroud that axially surrounds the contact, whereby the first housing member is effectively protected from heat generated at an electrical interface between the contact and the electrical bus as the electrical/electronic component operates.

* * * * *